US007213059B2

(12) United States Patent  (10) Patent No.: US 7,213,059 B2
Bhogal et al.  (45) Date of Patent: May 1, 2007

(54) METHOD, APPARATUS, AND COMPUTER PROGRAM PRODUCT TO DETERMINE THE PROGRESS OF WEB PAGE DOWNLOADS

(75) Inventors: Kulvir Singh Bhogal, Forth Worth, TX (US); Hung Dinh, Austin, TX (US); Teng Hu, Austin, TX (US); Mandeep Singh Sidhu, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 10/273,644

(22) Filed: Oct. 17, 2002

(65) Prior Publication Data

US 2004/0078453 A1   Apr. 22, 2004

(51) Int. Cl.
  G06F 15/16   (2006.01)
(52) U.S. Cl. ............... 709/219; 709/218; 709/219; 709/224
(58) Field of Classification Search ............... 709/218, 709/219, 224
  See application file for complete search history.

(56) References Cited

U.S. PATENT DOCUMENTS 5,908,467 A * 6/1999 Barrett et al. ............... 709/218
6,625,647 B1 * 9/2003 Barrick et al. .............. 709/224
6,927,770 B2 * 8/2005 Ording ........................ 345/440

OTHER PUBLICATIONS

Liam Quinn, "IMG-Inoine Image", Web Design Group, http://www.htmlhelp.com/reference/html40/special/img.html.
"Objects, Images and Applets", Dec. 24, 1999, Chapter 13 of World Wide Web Consortium HTML 4.01 Specification, http://www.w3.org/TR/REC-html40/struct/objects.html.
O'Reilly, "HTML, The Definitive Guide," 3rd edition, 1998, Section 13.1 and 13.2.
U.S. Appl. No. 09/881,924, filed Jun. 14, 2001, Dutta et al.

* cited by examiner

Primary Examiner—Ario Etienne
Assistant Examiner—Sahera Halim
(74) Attorney, Agent, or Firm—Marilyn Dawkins; Anthony V. S. England

(57) ABSTRACT

Progress is determined for downloading a Web Page having included objects. The method includes accessing the Web Page, and estimating a total size for the Web Page. The estimating includes reading file sizes for the objects. The file size for such an object has an association with a reference in the Web Page to the object. The reference includes a tag which has a first attribute with a source address for the object. The method further includes loading the objects for the Web Page, and presenting the estimated total size in comparison to an accumulated loaded amount of the Web Page objects. The comparison is updated at respective instances during the loading to dynamically indicate downloading progress. In another aspect, the presenting includes presenting the comparison on a browser program bar, and presenting the browser program bar on a task bar.

19 Claims, 6 Drawing Sheets

METHOD, APPARATUS, AND COMPUTER PROGRAM PRODUCT TO DETERMINE THE PROGRESS OF WEB PAGE DOWNLOADS

BACKGROUND

1. Field of the Invention

The invention concerns accessing Web pages, such as over the Internet, and more particularly concerns determining the progress of the Web page downloading.

2. Related Art

In recent years use of the Internet has become increasingly widespread. The name, "Internet," derives from reference to a collection of interconnected networks. The networks of the Internet include dissimilar networks interconnected by gateways that handle data transfer. These gateways convert messages among networks so that they conform to a common TCP/IP suite of protocols.

The World Wide Web ("WWW" or simply "Web") is an environment for transferring data over the Internet that is widely used and compatible with TCP/IP. In the Web environment, servers and clients transfer data including text, still graphic images, audio, video, etc. using a hypertext transfer protocol ("HTTP").

A document in the Web environment, also referred to as a "Web Page," is formatted according to a hypertext markup language ("HTML") which defines the syntax and placement of special, embedded directions. These embedded directions are not themselves ordinarily displayed, but rather specify how a browser will present the HTML document to a user. The directions also specify how objects such as still graphic images, audio, video, etc. are included in the document, and how the document is linked (also "hyperlinked") to other documents. Each HTML document is identified by a Uniform Resource Locator ("URL") which defines a communications path to the document. Thus, if a first document refers to a second document, the first document has an embedded link that includes the second document's URL which the browser knows how to interpret in order to retrieve the second document.

In many cases the objects included in a Web Page are large. Consequently the Web Page together with its included objects can take a long time to download to a user's client from an Internet server, particularly if the bandwidth of the Internet connection is low. Even with a fast server and a fast connection between a client and the Web Page's server, downloading may still be slow if the Web Page has objects located on other servers, as is often the case. This problem of downloading speed is made still worse because the user does not have complete information about how long it will take to download a Web Page. Current browsers provide some information, but not enough.

FIG. 1 illustrates downloading of a Web Page 105 for presentation on a display 120 of a client by a current browser, according to the prior art. The Web page 105 has a number of tags 110.1, 110.2 and 110.3 that refer to respective objects 112.1, 112.2 and 112.3. The objects 112.1, etc. may be still graphic images, movie clips, audio clips, applets, text files, etc. although the Web page 105 may reside on one server and the objects 112.1, etc. may reside on other servers, these objects are referred to as "inclusions" in the parlance of HTML because they are in a sense included in the Web Page 105. That is, when the browser in the client retrieves the Web page 105 and renders it for presentation in a browser window 130 on client display 120, the browser also retrieves the objects 112.1, etc. referred to by the tags 110.1, etc. and includes the objects 112.1, etc. in the window 130 as well.

Information presented to the user is rather limited in connection with downloading Web Page 105. With the browser window 130 open, status bar 135 is visible at the bottom of the window 130. The status bar 135 displays small text messages (not shown) identifying objects as they're being accessed, and to the right of those small text messages the status bar 135 graphically displays an object progress bar 137 which indicates progress in downloading respective objects as the objects are downloaded. While this does provide some information to the user about download progress its value is quite limited, since the user does not have information about how many objects are included in the Web Page 105, or the size of the objects. Furthermore, if the browser window 130 is obscured by an open window for another application on the desktop 125 even the limited information provided by the object progress bar 137 may be obscured. Also, if the browser window 130 is minimized the object progress bar 137 is likewise obscured. A program bar 145 remains visible for the minimized window 130 in the desktop 125 task bar 140, but the program bar 145 does not provide information about download progress.

From the foregoing it should be appreciated that a need exists to present users with more information about progress in downloading a Web Page.

SUMMARY

The foregoing need is addressed in the present invention, which in one form provides a method for presenting progress of downloading a Web Page having included objects. The method includes accessing the Web Page, and estimating a total size of the Web Page. The estimating includes reading file sizes for the objects. The file size for such an object has an association with a reference in the Web Page to the object. The reference includes a tag which has a first attribute with a source address for the object. The method further includes loading the objects for the Web Page, and presenting the estimated total size in comparison to an accumulated loaded amount of the Web Page objects. The comparison is updated at respective instances during the loading to dynamically indicate downloading progress.

In another aspect, the presenting includes presenting the comparison on a browser program bar, and presenting the browser program bar on a task bar, so that even if the browser window is minimized or obscured the progress remains visible.

In yet another aspect, the object's reference is associated with its file size by a second attribute of the tag, the second attribute including the file size.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
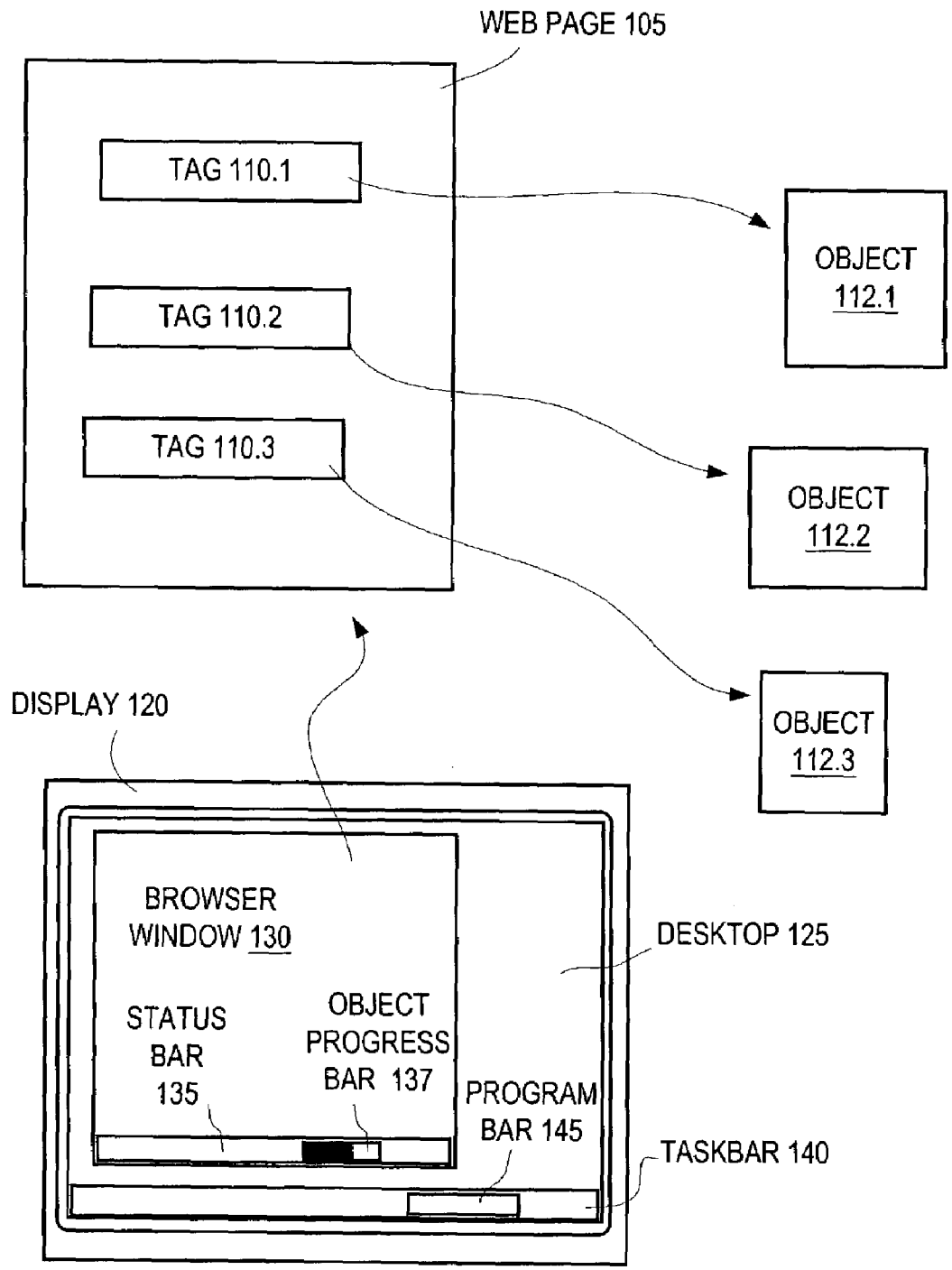
FIG. 1 illustrates downloading of a Web Page for presentation on a display of a client by a current browser, according to the prior art.
Figure 2:
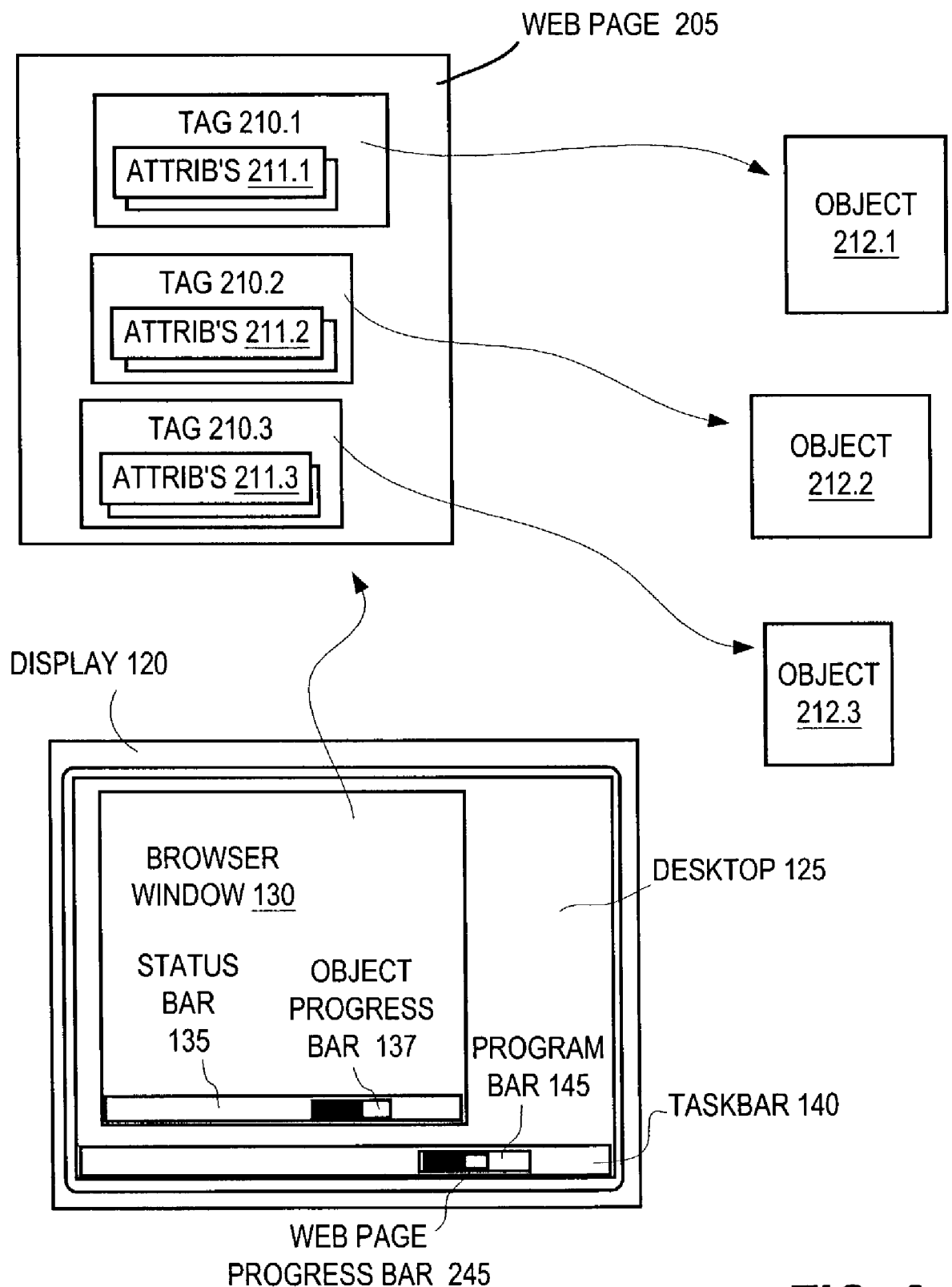
FIG. 2 illustrates downloading of a Web Page for presentation on a display of a client by a browser, according to an embodiment of the present invention.

Referring now to FIG. 2, downloading of a Web Page 205 is illustrated, according to an embodiment of the present invention. The Web Page 205 is downloaded and rendered under control of a browser (not shown) for presentation in a browser window 130 on the desktop 125 of a client display 120.

The browser window 130 has a status bar 135 which includes an object progress bar 137, as previously described. The desktop 125 has a task bar 140 and a program bar 145 for the browser, also as previously described. According to the embodiment, the program bar 145 includes a Web page progress bar 245 for presenting the estimated total size of the Web Page 205 in comparison to an accumulated loaded amount of the Web Page 205. The comparison is updated at respective instances during the loading to dynamically indicate downloading progress. This will be further described herein below in connection with explaining certain method aspects of an embodiment of the present invention. A point to note in this FIG. 2, however, is that because the progress bar 245 is located on the task bar 140, even if the browser window 130 is minimized or obscured the progress indicated on progress bar 245 remains visible. Moreover, even if there are multiple browser windows downloading respective Web pages, it should be understood that there would in this case be corresponding multiple browser program bars 145, each displaying its own Web Page progress bar 245.

There are references in the Web Page 205 to the Web page's included objects 212.1, 212.2 and 212.3. That is, Web page 205 has a number of tags 210.1, 210.2, and 210.3 with respective sets of attributes 211.1, 211.2 and 211.3. The tags 210.1, etc. refer to the objects 212.1, etc. as follows. One of the attributes in each tag includes an source address, i.e., a reference to the tag's included object. For example, in one embodiment, tag 210.1 is an <applet> tag, and its included object 212.1 is correspondingly a .class file. In one means for referring to the file for this tag, a "classid" attribute specifies the name of a file, such as "browserapplet.class," for example, in which the applet is located. If no other attribute in the tag specifies a variation, the browser will look for the file using the base URL for the Web Page 205. For example, if the Web page 205 URL is "http://www-.webpages.com/webpage205.html" the browser will look for the browserapplet.class file at the "http://www.webpages.com/browserapplet.class" address. There are other means for specifying file addresses for the <applet> tag which are related to the above example and are well-known to those of ordinary skill in HTML methods and structures. See, for example, O'Reilly, "HTML, The Definitive Guide," 3rd edition, 1998, Sections 13.1 and 13.2, which is hereby incorporated herein by reference.

In an embodiment, tag 210.2 is a <img> tag, and its included object 212.2 is correspondingly a static image file, such as a .gif file or a .jpg file. In one means for referring to the file 212.2 for this tag 210.2, an "src" attribute 211.2 of the tag 210.2 specifies the file's URL, i.e., address.

Tag 210.3 in an embodiment is an <object> tag, which can correspond to any number of different types of included objects, including applet files, static image files, audio files, movie files, etc. Means for referring to the object 212.3 file for this tag 210.3 are similar to the means described above for the object 210.1 <applet> file.

According to the embodiment illustrated in FIG. 2, the tags 210.1, etc. also include attributes 211.1, etc. that specify file sizes for their included objects 212.1, etc. For example, for tag 210.1 one of the attributes among the tag's attribute set 211.1 specifies the file size of the included object 212.1. In this manner, the file size for object 212.1, for example, has an association with a reference in the Web Page 205 to the object 212.1, the "reference" being the other one of the attributes 211.1 of the same tag 210.1 as described in the paragraphs immediately above, which indicates a source address for the object 212.1.

Two variations of the embodiment illustrated in FIG. 2 are as follows. In one variation, new ones of the attributes 211.1, etc., referred to, for example, as "filesize" attributes, are defined for the purpose of specifying file sizes for the corresponding objects 212.1, etc. That is, the one of the attributes 211.1, etc. is not included among those set out in the current HTML specification. In another variation, existing ones of the attributes 211.1, etc. are used for the purpose of specifying file sizes for the corresponding objects 212.1, etc. That is, the attributes are ones that are already defined by the current HTML specification for some purpose other than specifying file size, and the attributes are used, according to the embodiment, for specifying file sizes instead of, or in addition to their originally defined purpose. For example, the size of the file for object 212.1 maybe included in a "name" attribute, which is one of the attributes 211.1 for the tag 210.1 that refers to the file 212.1. The size may be included in a standardized way in the name attribute so that it can be easily parsed from the name string, such as by including delimiters, defining a predetermined length for the size string and putting the size string at the beginning of the name string, etc.

Figure 3:
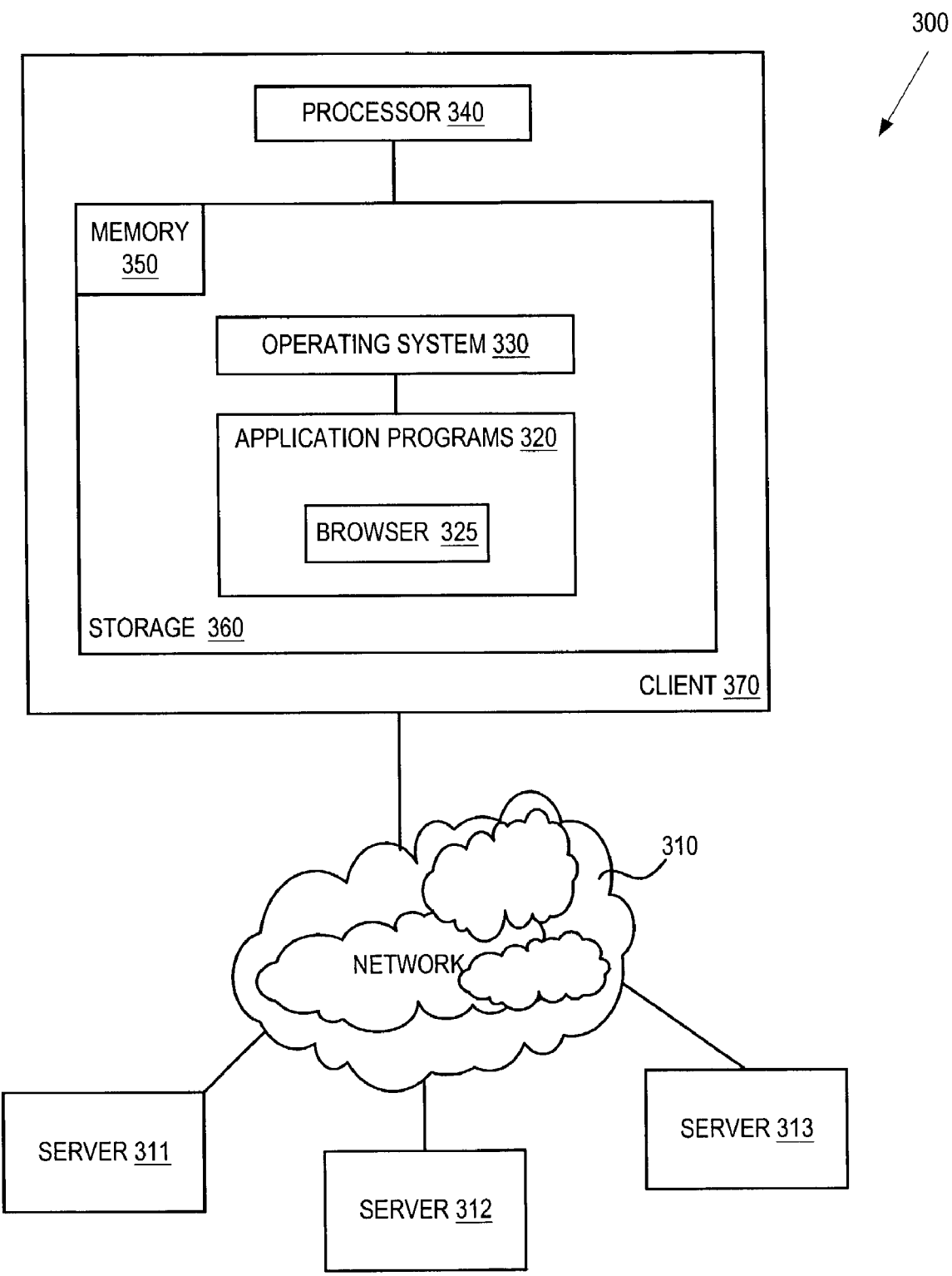
FIG. 3 illustrates a client running a browser application while connected to servers across a network, according to an embodiment of the present invention.

Referring now to FIG. 3, aspects of a computing environment 300 are illustrated. Client computer 370 includes processor 340 and memory 350. The client computer system 370 also may include a keyboard, pointing device, e.g., mouse, microphone and other input/output devices not shown. Components included in system 370 are interconnected by one or more buses not shown. A communications device (not shown) is connected to the bus to enable information exchange between the system 370 and external devices, including the servers 311–313.

Memory 350 includes volatile or nonvolatile storage or any combination thereof. The memory may be any suitable device including RAM, DRAM, SRAM, etc. Nonvolatile memory includes storage space 360, for example, hard disk drives, tapes, etc. for storing data, databases, and instructions (also known as a "software program"). The instructions are operable on the processor 340 for performing various methods in accordance with embodiments of the present invention. In various embodiments the one or more software programs are implemented in various ways, including procedure-based techniques, component-based techniques, and/ or object-oriented techniques, among others. Specific examples include XML, C++ objects, Java and Microsoft Foundation Classes (MFC).

The programs in memory include an operating system 330 and application programs 320 including a browser program 325 such as Microsoft Internet Explorer or Netscape Navigator. The browser program 325 displays a graphical user interface in which content is displayed from a file, such as a Web Page 205 (FIG. 2). The browser 325 is capable of retrieving such files from the servers 311 through 313 over the network 310. The browser program 325 and servers 311–313 communicate using a document transfer protocol such as HTTP or any other document transfer protocol, such as FTP, gopher, WAIS, etc. The network 310 may conform to TCP/IP, such as the Internet and World wide Web, or any network system known in the art, for example, local area network, Ethernet, wide area network, system area network, token Ring, etc.

In various embodiments, system 370 takes a variety of forms, including a personal computer system, mainframe computer system, server, client, workstation, Internet appliance, PDA, embedded processor with memory, etc. That is, it should be understood that the term "computer system" or simply "system" is intended to encompass any device having a processor that executes instructions from a memory medium. By way of further example, in one embodiment the client computer system 370 of FIG. 3 is an IBM NetVista system and the server computer systems 311, etc. are IBM System 390 computers.

Figure 4:
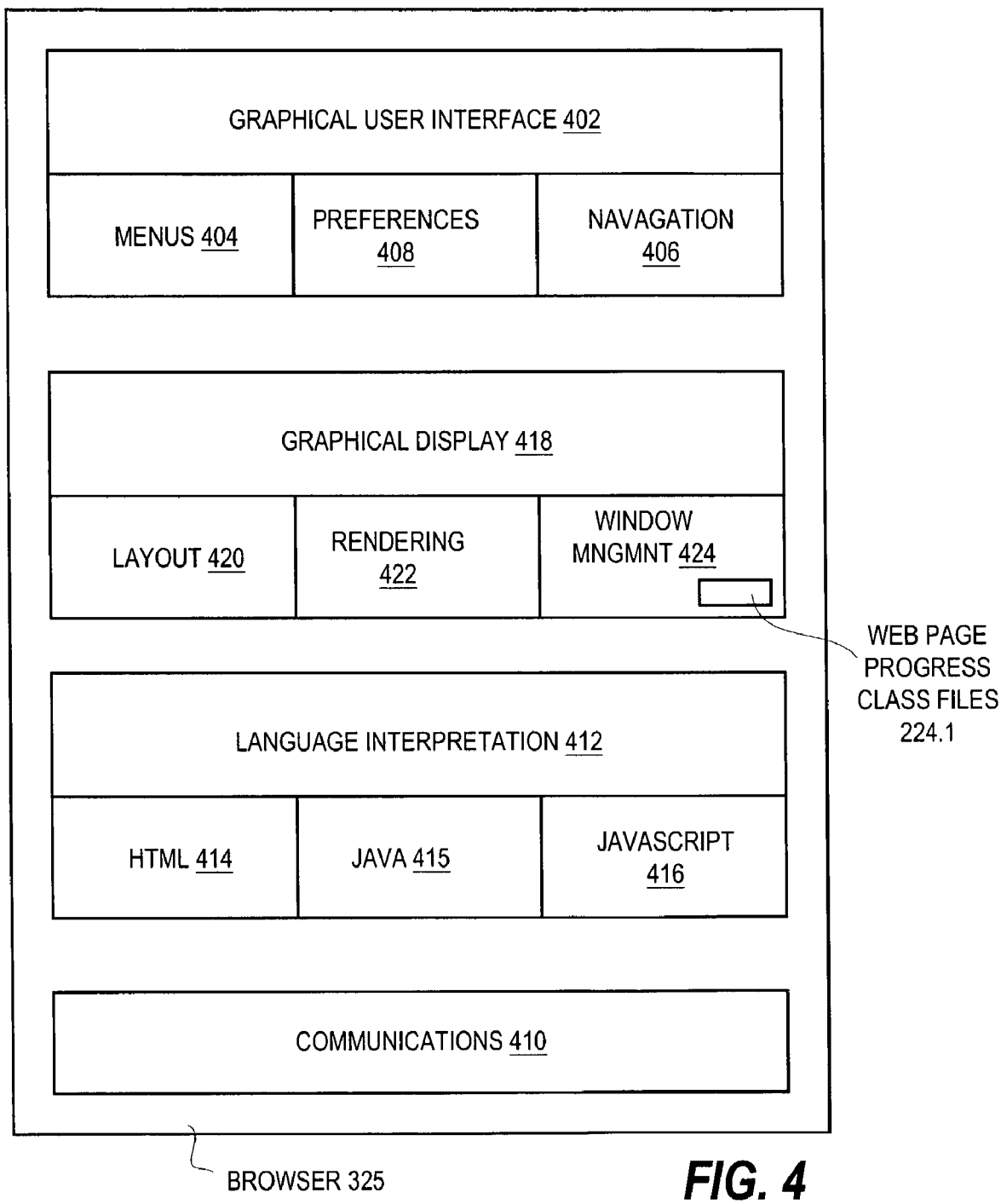
FIG. 4 illustrates certain details of the browser, according to an embodiment of the present invention.

Referring now to FIG. 4, certain details of the browser 325 are illustrated, according to an embodiment of the present invention. The browser 325 includes class files which perform numerous functions, including a graphical user interface 402 that allows the user to communicate with the browser 325. This interface 402 provides for selection of various functions through menus 404 and includes functions for navigation 406. For example menus 404 enable a user to perform functions such as saving a file, opening a new browser window, displaying history and entering a URL. The functions for navigation 406 allow the user to navigate Web pages, including selecting web sites for viewing. For example, navigation 406 functions provide buttons, scroll bars, and the like that allow a user to move within a current Web Page and see a previous page or subsequent page relative to the current page. User preferences may be set through functions provided in preferences 408.

Communications 410 functions provide a mechanism by which the browser program 325 receives documents and other resources from the network. Communications 410 functions also permit sending (aka "uploading") documents and other resources to the network. In the embodiments depicted herein, communications 410 functions use HTTP. In other embodiments different protocols are used. Documents received by browser 325 are processed by language interpretation 412 functions, which include interpretation capability for HTML 414, Java 415 and JavaScript 416. The language interpretation functions 412 process documents for presentation by graphical display 418 functions.

Graphical display 418 functions include layout 420, rendering 422 and window management 424. These functions 418 are involved in presenting Web pages to a user based on results from language interpretation 412 functions.

Note in particular that for one embodiment of the present invention window management functions 424 include Web Page progress class files 424.1. A browser application conventionally includes class files that enable it to perform functions that support conventional HTML features. In accordance with features illustrated in FIG. 2, the Web Page progress class files 424.1 supplement conventional class files in the browser application 325 in order to enable the browser 325 to search for, parse and read the non-conventional ones of the attributes 211.1, etc. (FIG. 2), referred to above as the "filesize" attributes. In another embodiment, also in accordance with one of the embodiments of FIG. 2, the Web Page progress class files 424.1 supplement the browser 325 conventional class files to enable the browser 325 to search for, parse and read the file sizes that are embedded in a structured way in the conventional ones of the attributes 211.1, etc., such as the "name" attribute. In either embodiment, the class files 424.1 enable the browser 325 to perform calculations using the file sizes read from the attributes, monitor downloading progress, and communicate dynamic progress indications for presenting on the Web Page progress bar 245 (FIG. 2).

Figure 5:
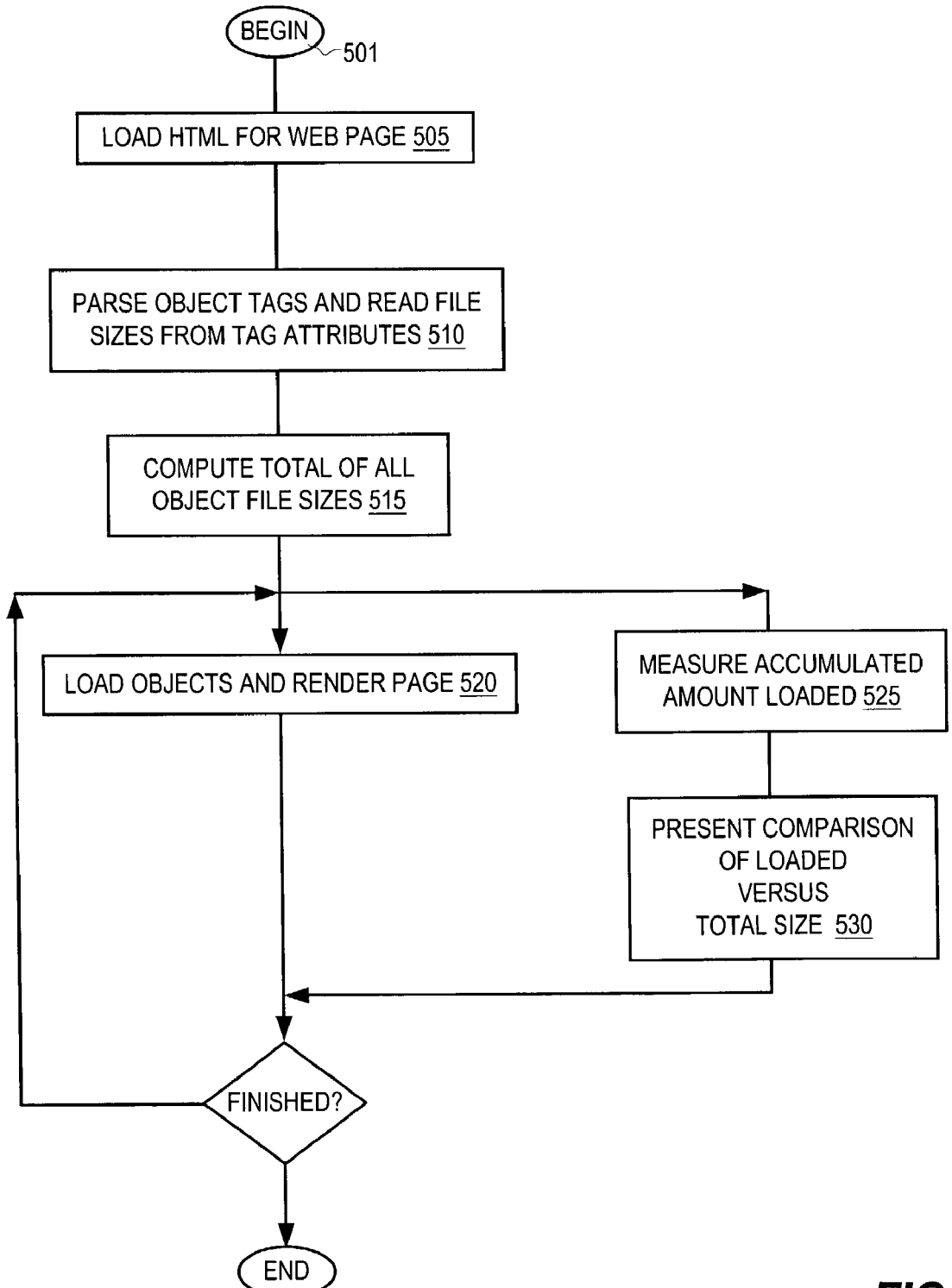
FIG. 5 illustrates logic for certain methods, according an embodiment of the present invention.

Referring now to FIG. 5, logic is illustrated for certain method aspects of the invention, according an embodiment. The logic begins at 501, then at 505 the browser loads HTML for a Web Page. At 510 the browser parses the HTML and reads file sizes from the attributes for all included object tags. At 515 the method computes the total of all the object file sizes for the Web Page. Since the combined size of all the included objects is typically much larger than the rest of the page, this computed total is a good estimate of the total size for the Web Page and its included objects. Next, at 520 the browser begins to load and render the objects. Concurrently, at 525, the method measures the accumulated amount loaded at instances, which may be either time interval-based or based on events. For example, the accumulated amount may be updated every 500 bytes or every 2 seconds. The browser may be provided with a menu permitting the user to specify options concerning frequency or events for this updating.

Also concurrent with the loading, when the accumulated amount downloaded is updated a comparison is presented at 530 of the loaded amount versus total size. As shown in FIG. 2, this may be done as a bar that increases as the proportion of the loaded amount approaches the total estimated size of the page. Alternatively, of course, the bar may instead decrease in proportion to the loaded amount. At 535 the logic checks for completion of downloading all objects. If not complete the logic continues at 520 and 525/530.

Figure 6:
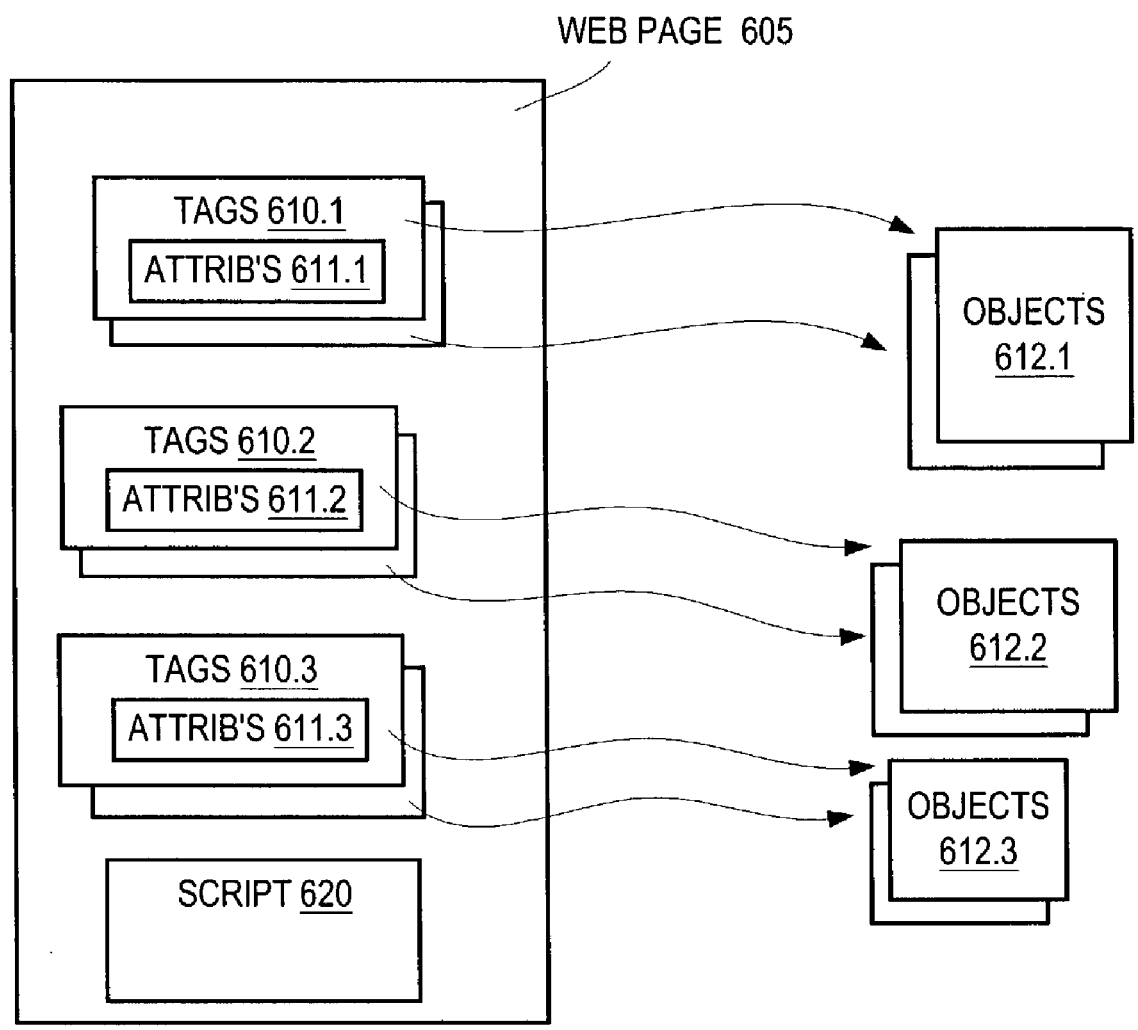
FIG. 6 illustrates certain alternatives to features illustrated in FIG. 2, according to embodiments of the present invention.

Referring now to FIG. 6, certain alternatives to features shown in FIG. 2 are illustrated, according to embodiments of the present invention. In Web Page 605, rather than providing file size information for an object such as object 612.1 in one of the attributes 611.1 of the object's tag 610.1, the file size information is provided in another object. That is, in the illustration the Web Page 605 has tags 610.1, 610.2 and 610.3 and their corresponding included objects 612.1, 612.2 and 612.3 in associated pairs, one of the pairs of objects 612.1, etc. being for an image file, audio file, movie file, etc. and one of the pairs being for the file size.

Another alternative feature is also illustrated in FIG. 6, according to an embodiment of the present invention. Recall that two attribute-related embodiments were described above in connection with FIG. 2. In connection with FIG. 4 an arrangement was described above in which conventional class files of the browser 325 are supplemented with new class files 424.1 to enable web-page-downloading- progress-related functions that obtain file size information from tag attributes in one or the other of the two attribute-related embodiments. In an alternative arrangement illustrated in FIG. 6, instead of supplementing the conventional class files of browser 325 (FIGS. 3 and 4) the Web Page 605 includes a script 620, such as one built in Java, so that the browser 325 can execute the script 620 for performing the web-page-downloading-progress-related functions for one or the other of the attribute-related embodiments.

In a second variation on this alternative, instead of supplementing the conventional class files of browser 325 (FIGS. 3 and 4) an applet is delivered to the browser 325 as one of the objects 212.1, etc. (FIG. 2) included in Web Page 205 (FIG. 2) so that the browser 325 can execute the applet for performing the web-page-downloading-progress-related functions for one or the other of the attribute-related embodiments. Like the script 620 of FIG. 6, this arrangement using an applet is advantageous in that it enables the invention to be practiced using a conventional browser.

The description of the present embodiment has been presented for purposes of illustration, but is not intended to be exhaustive or to limit the invention to the form disclosed. Many modifications and variations will be apparent to those of ordinary skill in the art. For example, those of ordinary skill in the art will appreciate that processes of the present invention are capable of being performed by a processor responsive to stored instructions, and accordingly some or all of the processes may be distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

In another example, instructions can be provided for the browser to open the browser window for the page being downloaded responsive to completing the downloading of the page.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method for presenting progress of downloading a Web Page having included objects, the method comprising:
   accessing the Web Page;
   estimating a total size for the Web Page, wherein the estimating comprises reading file sizes for the objects, the file size for such an object having an association with a reference in the Web Page to the object, and wherein the reference comprises a tag having a first attribute with a source address for the object;
   loading the objects for the Web Page; and
   presenting the estimated total size in comparison to an accumulated loaded amount of the Web Page objects, wherein the comparison is updated at respective instances during the loading in order to dynamically indicate progress;
   presenting the comparison on a browser program bar and at least one object progress bar wherein said at least one object progress bar presents the loaded amount of at least one web page object; and
   presepting the browser program bar on a task bar, wherein when the Web page is loaded, the Web page is shown in a browser window if the browser window is displayed, and wherein the task bar is associated with a desktop display, so that even if the browser window for the Web page is minimized or obscured, presentation of download progress remains visible.

2. The method of claim 1, wherein such an object's reference is associated with the object's file size by a second attribute of the tag, the second attribute including the file size.

3. The method of claim 2, wherein the second attribute is defined by an markup language specification for a purpose other than the specifying of file size, and the method comprises:
   parsing the file size from the second attribute.

4. The method of claim 1, wherein such an object's reference is associated with the object's file size by a second tag, the second tag including an attribute with a source address for the file size.

5. The method of claim 1, wherein the reading comprises:
   accessing, by the browser, instructions for reading the file sizes.

6. The method of claim 5, wherein the instructions include instructions in the Web Page.

7. The method of claim 5, wherein the instructions include instructions at a source having a source address in the Web Page.

8. A computer program product, stored on a tangible, computer readable medium, for presenting progress of downloading a Web Page having included objects, said computer program product having instructions for execution by a computer, which, when executed by the computer, cause the computer to implement a method comprising the steps of:
   accessing the Web Page;
   estimating a total size for the Web Page, wherein the estimating comprises reading file sizes for the objects, the file size for such an object having an association with a reference in the Web Page to the object, and wherein the reference comprises a tag having a first attribute with a source address for the object;
   loading the objects for the Web Page; and
   presenting the estimated total size in comparison to an accumulated loaded amount of the Web Page objects, wherein the comparison is updated at respective instances during the loading in order to dynamically indicate progress;
   presenting the comparison on a browser program bar and at least one object progress bar wherein said at least one object progress bar presents the loaded amount of at least one web page object; and
   presenting the browser program bar on a task bar, wherein when the Web page is loaded, the Web page is shown in a browser window if the browser window is displayed, and wherein the task bar is associated with a desktop display, so that even if the browser window for the Web page is minimized or obscured, presentation of download progress remains visible.

9. The computer program product of claim 8, wherein such an object's reference is associated with the object's file size by a second attribute of the tag, the second attribute including the file size.

10. The computer program product of claim 8, wherein such an object's reference is associated wit the object's file size by a second tag, the second tag including an attribute with a source address for the file size.

11. The computer program product of claim 8, wherein the reading comprises:

accessing, by the browser, instructions for reading the file sizes.

12. The computer program product of claim 11, wherein the instructions for reading the file sizes include instructions in the Web Page.

13. The computer program product of claim 11, wherein the instructions for reading the file sizes include instructions at a source having a source address in the Web Page.

14. A computer system for presenting progress of downloading a Web Page having included objects, the computer system comprising:
   a processor; and
   a memory, wherein the memory includes instructions and the processor is operable under control of the instructions to perform the steps of:
   accessing the Web Page;
   estimating a total size for the Web Page, wherein the estimating comprises reading file sizes for the objects, the file size for such an object having an association with a reference in the Web Page to the object, and wherein the reference comprises a tag having a first attribute with a source address for the object;
   loading the objects for the Web Page; and
   presenting the estimated total size in comparison to an accumulated loaded amount of the Web Page objects, wherein the comparison is updated at respective instances during the loading in order to dynamically indicate progress;
   presenting the comparison on a browser program bar and at least one object progress bar wherein said at least one object progress bar presents the loaded amount of at least one web page object; and
   presenting the browser program bar on a task bar, wherein when the Web page is loaded, the Web page is shown in a browser window if the browser window is displayed, and wherein the task bar is associated with a desktop display, so that even if the browser window for the Web page is minimized or obscured, presentation of download progress remains visible.

15. The computer system of claim 14, wherein such an object's reference is associated with the object's file size by a second attribute of the tag, the second attribute including the file size.

16. The computer system of claim 14, wherein such an object's reference is associated with the object's file size by a second tag, the second tag including an attribute with a source address for the file size.

17. The computer system of claim 14, wherein the processor is operable under control of the instructions to perform the steps of:
   accessing, by the browser, instructions for reading the file sizes.

18. The computer system of claim 17, wherein the instructions for reading the file sizes include instructions in the Web Page.

19. The computer system of claim 17, wherein the instructions for reading the file sizes include instructions at a source having a source address in the Web Page.

* * * * *